United States Patent [19]
Harkins

[11] Patent Number: 6,038,322
[45] Date of Patent: Mar. 14, 2000

[54] GROUP KEY DISTRIBUTION

[75] Inventor: Dan Harkins, San Jose, Calif.

[73] Assignee: Cisco Technology, Inc., San Jose, Calif.

[21] Appl. No.: 09/175,240

[22] Filed: Oct. 20, 1998

[51] Int. Cl.⁷ .............................. H04L 9/08; H04L 9/30; H04L 9/32; H04K 1/02
[52] U.S. Cl. .................. 380/279; 380/281; 380/282; 713/155; 713/156; 713/163
[58] Field of Search .................. 380/279, 281, 380/282; 713/155, 156, 163, 170, 171, 176, 178

[56] References Cited

U.S. PATENT DOCUMENTS

| | | | |
|---|---|---|---|
| 4,956,863 | 9/1990 | Goss | 380/30 |
| 5,729,608 | 3/1998 | Janson et al. | 380/21 |
| 5,889,865 | 3/1999 | Vanstone et al. | 380/25 |

FOREIGN PATENT DOCUMENTS

| | | | |
|---|---|---|---|
| 195 14 084 C1 | 4/1995 | Germany | H04L 9/00 |

OTHER PUBLICATIONS

Zheng, Y. and Imai, H., "Compact and Unforgeable Key Establishment over an ATM Network," in INFOCOM '98. 17th Conf. IEEE Computer and Communications Societies, Apr. 2, 1998, pp. 411–418.

H. Harney et al., "Group Key Management Protocol (GKMP) Specification," Jul. 1997, http://info.internet.isi.edu/in–notes/rfc/files/rfc2093.txt, pp. 1–18.

H. Harney et al., "Group Key Management Protocol (GKMP) Architecture," Jul. 1997, http://info.internet.isi.edu/in–notes/rfc/files/rfc2094.txt, pp. 1–17.

*Primary Examiner*—Gilberto Barrón, Jr.
*Assistant Examiner*—Justin T. Darrow
*Attorney, Agent, or Firm*—Carr & Ferrell LLP

[57] ABSTRACT

A method for distributing a secret key from a key holder H to intended group members M. The method assumes that during the distribution process each party, a group member M and the key holder H, can decrypt and encrypt exchanged information such that the encrypter knows that the decrypter will be the intended party. The method preferably uses a public key/private key encryption technique in which, for example, a trusted Certificate Authority in a public key infrastructure signs the certificates to provide the public keys involved in the encryption. Alternatively, the method, together with a symmetric cipher, uses a shared secret, established in an authenticated mechanism that is outside the information exchanges of the invention. Additionally, the method uses a strong mixing function that takes several items of data as input and produces a pseudo-random authentication (or digest). Inputs to the mixing function include identity stamps that are generated by each member M and key holder H. These inputs can be the identity of the stamp generator, such as a network address, port, or protocol, a timestamp, and/or a secret value that is known only to the stamp generator. The stamps include information to bind member M if generated by key holder H, and to bind key holder H if generated by member M. Consequently, the invention authenticates each communication exchange between member M and key holder H.

45 Claims, 5 Drawing Sheets

GROUP KEY DISTRIBUTION

BACKGROUND OF THE INVENTION

1. Technical Field

This invention relates generally to electronic communications and more particularly to communicating messages securely to an intended group.

2. Discussion of the Backgound Art

Transmitting secure messages from one party over public communication channels to another party poses several problems. The message transmitter and recipient often desire that a message be transmitted to and from the intended party and not be intercepted by a third party. Cryptography, including Diffie-Helman exchanges, public/private key methodology, and other encryption techniques, provides different ways of message encryption and/or authentication which help solve this problem. Each party using a public/private key encryption technique has a public key $K_{pu}$ and a private key $K_{pr}$. Public key $K_{pu}$ is made available so that any member of the public can use it to encrypt a message. Private key $K_{pr}$ is kept private to one party so that only he can use it to decrypt messages that were encrypted with public key $K_{pu}$.

Many communication applications, such as secure multicast transmissions and secure routing protocols, involve a group of more than two communicating parties, and require establishment of a common secret key for use by the group members. Diffie-Hellman exchanges can be extended to work with a group. However, an N-member group requires each party to perform N exponentiation operations, so as N increases the communication expense increases disproportionately. Further, adding a single new member requires all parties to take part in a new multiparty exchange, making this technique unsatisfactory, for example, for dynamic multicast groups.

Harney et al. in "Group Key Management Protocol" (GKMP), September 1994, provide a solution to specifically distribute a secret key to intended group members. In Harney each party first performs an authenticated Diffie-Hellman exchange with a key holder. The key holder then uses a session key generated from the Diffie-Heilman exchange to encrypt the secret key and sends the result to the requesting party.

Harney also is expensive because it requires a complete exchange with two costly exponentiations and at least two public key operations to authenticate the communication. Additionally, the secret key is directly encrypted with the Diffie-Hellman secret key using a symmetric cipher in which an encryption key can be calculated from a corresponding decryption key and vice versa. In many cases the encryption key and decryption key are identical and each party in the communication exchange must agree on the keys before they are used. Harney thus allows a third party seeking to steal the secret key to attack only the symmetric cipher.

U.S. Pat. No. 5,729, 680 to Janson et al. discloses a method for distributing a key from a party B to a party A, which provides a basis for distributing the key in multi-party communications. However, Janson requires that parties A and B share a common key $K_{ab}$ prior to protocol execution. Additionally, Janson does not initially exchange identity stamps to be used in subsequent communication exchanges to provide liveness proof of each party A and party B during these communication exchanges. Liveness proof of party A proves to party B that party B received the subject information from party A, and not from a third party who could have recorded a previous communication from party A to party B and then replayed the communication to party B. Similarly, liveness proof of party B proves to party A that party A received the subject information from party B. Janson then discloses that party A, upon receiving the secret key from party B, sends receipt acknowledgement to party B. In addition, party A authenticates itself to party B, but not vice-versa. Party A thus does not have proof that party B is the actual key holder and not an imposter.

In light of the deficiencies of the prior art, what is needed is a technique to quickly, efficiently, and securely distribute a secret key to intended group members.

INVENTION SUMMARY

The invention provides a key distribution method in which a key holder H distributes a secret key K to only intended group members M. During the distribution process the invention assures that each party, a member M and the key holder H, can encrypt and decrypt exchanged information such that the encrypter knows that the decrypter will be the intended party. The invention preferably uses a public key/private key encryption technique in which, for example, a trusted Certificate Authority in a public key infrastructure signs the certificates to provide the public keys involved in the encryption. Alternatively, the invention, together with a symmetric cipher, uses a shared secret, established through an authenticated mechanism outside the information exchanges of the invention. Additionally, the invention uses a strong mixing function that takes several pieces of data as input and produces a pseudo-random authentication (or digest). Data inputs to the mixing function include identity stamps that are generated by each member M and key holder H. These inputs can be the identity of the stamp generator, such as a network address, port, or protocol, or can be a timestamp and/or a secret value that is known only to the stamp generator. The stamps include information to bind member M if generated by key holder H, and to bind key holder H if generated by member M. Consequently, the invention authenticates each communication exchange between member M and key holder H.

In accordance with the invention, a key requester, normally an intended group member M, chooses a random code $R_m$ and uses encryption key $K_{he}$ to encrypt code $R_m$ and form encrypted code $R_{me}$. Member M then sends encrypted code $R_{me}$ to key holder H. Key holder H uses decryption key $K_{hd}$ to decrypt the encrypted code $R_{me}$ and thereby acquire code $R_m$. Key holder H then creates a coded secret of secret key K; he preferably takes the exclusive-OR of secret key K and code $R_m$ to generate a code $R_h$. Key holder H then uses encryption key $K_{me}$ to encrypt code $R_h$ and sends it to member M. Member M then, using decryption key $K_{md}$, decrypts the encrypted code $R_h$ and derives secret key K by performing the exclusive-OR of the two codes $R_h$ and $R_m$. In addition, each party generates an identity stamp, which is a pseudo-random bit stream that is bound to his identity, and uses this stamp when needed as a liveness proof in communication exchanges. The invention also uses time stamps, mixing functions including hashing, and digital signatures for further security and authentication. Group members do not need to know one another, but must trust the encryption keys $K_{me}$ and $K_{he}$. This can be accomplished by using a certificate authority.

Because the invention requires two encryptions in communication exchanges, attacking the invention's scheme for protecting secret key K requires breaking two difficult encryptions, especially when the preferred embodiment uses the public/private key encryption technique. Breaking each public/private key encryption is more difficult than breaking a single symmetric cipher as in Harney because breaking a public/private key encryption involves factoring a very large number, which may have over a thousand bits, into two smaller prime numbers while breaking a symmetric cipher requires breaking two codes. Further, the invention costs less because it incurs low overhead and does not involve expensive Diffie-Hellman exchanges. The invention, allowing efficient addition of new members, is also relatively simple, fast, scalable, and secure. In the preferred embodiment, where certificates in a public key infrastructure provide public encryption keys (key $K_{me}$ and key $K_{he}$) for the public/private key encryption technique, the invention does not require bootstrapping, i.e., prior communication or configuration.

DETAILED DESCRIPTION OF THE PREFERRED EMBODIMENT

The present invention provides a group key distribution technique useful for both unicast and multicast applications. Unicast (or point cast) operations transmit messages to one machine, node, or "point" which is the only node or point that can receive the message. A closed-circuit video, for example, is a unicast operation. Multicast operations send messages to many machines that can receive the signals simultaneously, as in general television broadcasting.

The invention creates a secure group in which a key holder H holds a secret key K. Based on a controlled policy, key holder H can explicitly deny or permit a requester to access to key K, which is preferably a number, chosen randomly by any of various methods such as, for example, based on the controlled policy, deriving the number from a Diffie-Hellman exchange with any two group members.

For illustrative purposes, this Specification uses the following notations:

Request R: a message sent by member M to key holder H to request the secret key K.

Stamp $C_m$: a code generated by member M that includes key holder H's identity, is unique to and binds key holder H to each sequence of information exchanges ((1) through (4) below).

Stamp $C_h$: a code generated by key holder H that includes member M's identity, is unique to and binds member M to each sequence of information exchanges ((1) through (4) below).

Each stamp $C_m$ or $C_h$ is preferably a pseudo-random bit stream generated from a function, which, given the same input, repeatedly produces the same output. For example, each stamp $C_m$ and $C_h$ can result from combining in a strong mixing function, such as the Secure Hash Standard or HMAC-SHA, the other party's identity (key holder H's identity for stamp $C_m$ and member M's identity for stamp $C_h$), a timestamp, and a secret, preferably a number, known only to the stamp generator.

Authorization: a response from key holder H to member M's request.

Code $R_m$: a random number chosen by member M.

Code $R_h$: a coded secret of key K, preferably resulting from an exclusive-OR of secret key K and code $R_m$.

Authentication-M: the result of combining preferably stamp $C_m$, stamp $C_h$, code $R_m$, and member M's identity in a strong mixing function.

Authentication-H: the result of combining preferably stamp $C_m$, stamp $C_h$, code $R_m$, code $R_h$, member M's identity, and key holder's H identity in a strong mixing function.

Each Authentication-M and Authentication-H is preferably generated from a hash function, such as the Secure Hash Standard or HMAC-SHA.

{X}En__Y: an encryption of X, preferably using a public key of Y

{X}Sig__Y: a digital signature of X by Y. For example, {Authentication-M}Sig__member__M denotes that member M digitally signs Authentication-M to form a member M digital signature.

Figure 1:
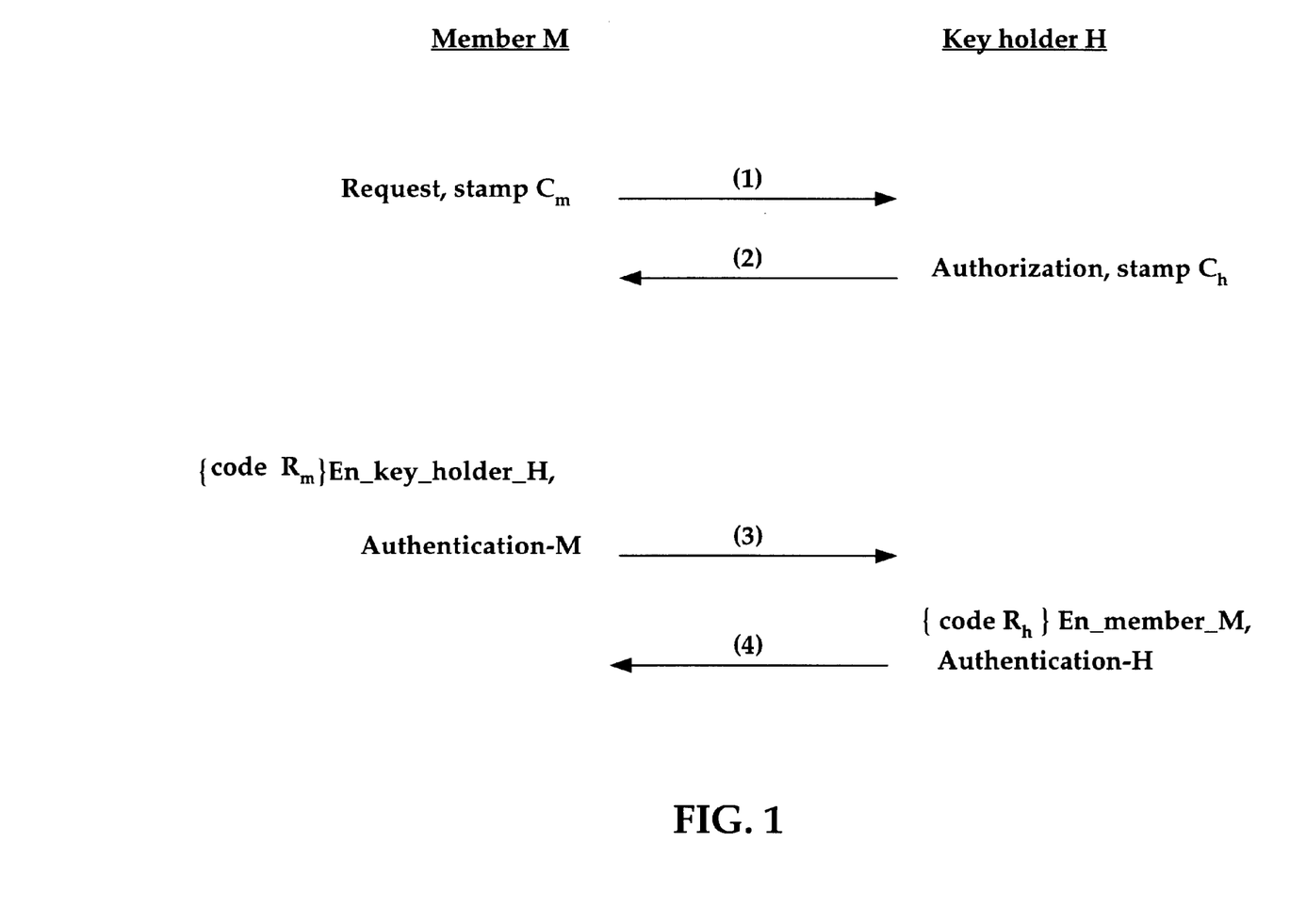
FIG. 1 illustrates a first preferred embodiment of the invention exchanging communications between a group member and a key holder.

FIG. 1 illustrates a first preferred embodiment of the invention that involves four communication exchanges (1), (2), (3), and (4) between a member M and key holder H. In exchange (1) member M sends a request R for the secret key K to key holder H. Member M also sends key holder H stamp $C_m$, which preferably accompanies subsequent information exchanges between member M and key holder H. $C_m$ is unique to and thus binds key holder H in these exchanges because stamp $C_m$ preferably includes key holder H's identity, a timestamp, and a secret number known only to member M. Member M also preferably associates with himself an identity, which may be implicit like an internet protocol (IP) address, an email address, or any explicitly defined identity. Certain applications may omit sending a Request because group members M are assumed to receive messages from key holder H without a request.

In exchange (2) key holder H provides stamp $C_h$ to member M. A stamp $C_h$, like stamp $C_m$, preferably accompanies each exchange of information between member M and key holder H to protect against "replay attacks," in which a third party attempts to elicit responses from key holder H as if the third party were member M. A third party may record information communicated from member M to key holder H, and, pretending to be member M, then replay the information to key holder H. Replay attacks cause unnecessary and additional work for key holder H, may fill his disk and/or his memory, and/or clog his system. Further, since stamp $C_h$ will be included in Authentication-M in communication exchange (3) from member M to key holder H, stamp $C_h$ in exchange (3) also provides liveness proof to key holder H. This is because key holder H generates a stamp $C_h$ that member M cannot control, and an unintended member M who does not take part in this exchange (2) will not be able to construct a valid Authentication-M that includes stamp $C_h$ in exchange (3). Since stamp $C_h$ will bind the intended member M in subsequent information exchanges, the invention, to protect against replay attacks, will not respond to a third party who is not bound by stamp $C_h$. Stamp $C_h$ is preferably valid only during a given time interval, the length of which depends on individual situations, and communication between key holder H and member M must occur in that interval.

In exchange (3) member M sends Authentication-M and an encrypted code $R_{me}$ ({code $R_m$}En_key_holder_H) of code $R_m$ to key holder H. Stamp $C_h$ in Authentication-M protects against replay attacks and provides liveness proof that member M is indeed the intended member M. Stamp $C_m$ proves that member M participated in communication exchange (1). Code $R_m$ is to mask the secret key K that will be sent from key holder H to member M in exchange (4). Since a third party may use a public key $K_{he}$ of key holder H to encrypt a faked code $R_m$, a real code $R_m$ is included in Authentication-M to bind code $R_m$ in this exchange (3) to member M's identity that is also included in Authentication-M. Those skilled in the art will recognize that only stamp $C_h$ in Authentication M is sufficient to prove that intended member M in exchange (3) sends the information to key holder H. Authentication-M thus, when received by key holder H, proves to him that group member M constructed the Authentication-M, knows the unencrypted code $R_m$, and is the holder of the stamp $C_m$. Member M preferably uses a public key $K_{he}$ of key holder H in a well-known public/private key encryption technique to encrypt code $R_m$ and form the encrypted code $R_{me}$. Certificates, for example, signed by a trusted Certificate Authority in a public key infrastructure, can provide public key $K_{he}$ of key holder H. Alternatively, member M, in conjunction with a symmetric cipher, can use a share secret mechanism outside of the communication exchanges of the invention so that member M knows that only key holder H can decrypt the encrypted code $R_{me}$.

Key holder H, upon receiving Authentication-M and encrypted code $R_{me}$, preferably uses private key $K_{hd}$ associated with public key $K_{he}$ to decrypt encrypted code $R_{me}$ and acquire code $R_m$. Because member M used key holder H's public key $K_{he}$ to encrypt code $R_m$, only key holder H can decrypt encrypted code $R_{me}$. If member M uses an encryption technique other than the public/private key technique, then the invention assumes that only key holder H can decrypt the encrypted code $R_{me}$. Key holder H also re-computes Authentication-M to confirm that he received the intended information from member M, and key holder H thereby confirms that member M knows the value of code $R_m$. Key holder H further checks the identity of stamp $C_h$ (included in Authentication-M), which should be bound to member M. Since key holder H generated stamp $C_h$ and sent it to member M in exchange (2), key holder H should be able to regenerate stamp $C_h$. Further, since stamp $C_h$ contains a secret number known only to key holder H, key holder H, upon confirming that stamp $C_h$ is valid, knows that member M is intended member M. If Authentication-M or identity of stamp $C_h$ is invalid, then key holder H is not dealing with the authenticated intended member M and presumably will cease communication with "member M." Mixing stamp $C_m$, stamp $C_h$, code $R_h$, and member M's identity, which results in Authentication-M, checking the identity of code $C_h$, and verifying Authentication-M prevent third parties from interfering with the intended exchange of information.

In exchange (4) key holder H sends encrypted code $R_{he}$ ({code $R_h$}En_key_holder_H) and Authentication-H to member M. Code $R_{he}$ is an encryption of code $R_h$ that in turn is a coded secret of key K. Key holder H preferably takes an exclusive-OR of secret key K and code $R_m$ to generate code $R_h$. Taking an exclusive-OR of the two binary numbers key K and code $R_m$ provides a number code $R_h$, which if exclusive-ORed with code $R_m$ provides key K. The exclusive-OR function thus provides a secret code for key K because only those members M who know code $R_m$ can re-generate key K from code $R_h$. Persons skilled in the art will recognize that any reversible function can be substituted for the exclusive-OR function. Key holder H preferably uses public key $K_{me}$ of member M to encrypt code $R_h$ and form encrypted code $R_{he}$. Because code $R_h$ was encrypted, exchange (4) provides additional security against a third party's intermeddling with code $R_h$. In this preferred embodiment, a third party attacker would be required to break two encryptions, one from member M to key holder H in exchange (3) and one from key holder H to member M in exchange (4). Further, key holder H knows that only member M can decrypt the encrypted code $R_{he}$ to derive the secret key K. Stamp $C_m$ in Authentication-H provides a liveness proof to member M that key holder H is an active participant in the exchange. Stamp $C_h$ provides a further liveness proof and further binds key holder H to the exchange. Code $R_m$ proves that key holder H is the real key holder H because only key holder H was able to acquire code $R_m$. Code $R_h$ provides indirect authentication of the secret key K since code $R_h$ and code $R_m$ are used to generate the secret key K. The identities of member M and of key holder H prove that each party acknowledged the identity of the other and further bind each party to the exchange. Those skilled in the art will recognize that stamp $C_m$ and code $R_m$ are sufficient to prove that key holder H sends the information in exchange (4). Authentication-H serves the same function as Authentication-M, that is, Authentication-H, when received by member M, proves to him that key holder H constructed Authentication-H, knows the unencrypted code $R_h$ and the secret key K, and is the holder of the valid stamp $C_h$.

Member M, upon receiving the information in exchange (4), re-computes Authentication-H to confirm that member M received the intended information from key holder H and that key holder H knows both code $R_h$ and code $R_m$. Verifying Authentication-H also provides liveness proof to member M that member M received the intended information from key holder H because Authentication-H contains member M's code $R_m$, which was acquired only by key holder H and also contains stamp $C_m$, which is an ephemeral code provided by member M and bound to key holder H. Member M then takes an exclusive-OR of code $R_h$ and code $R_m$ to acquire secret key K. Because secret key K was exclusive-ORed with code $R_m$ that was provided by member M to form code $R_h$, only a member M who knows code $R_m$ can derive secret key K from code $R_h$.

Figure 2:
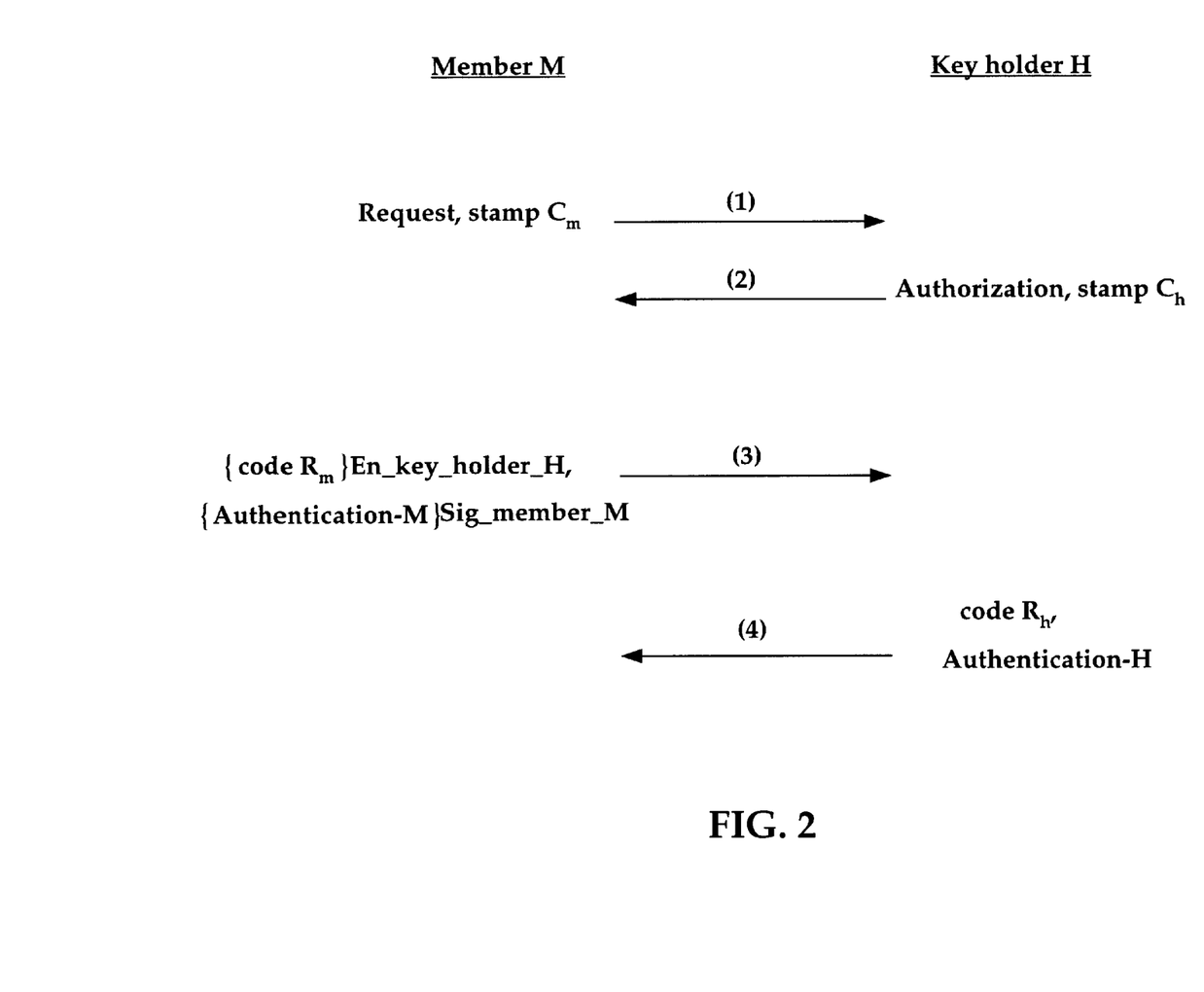
FIG. 2 illustrates a second preferred embodiment of the invention.

FIG. 2 illustrates the invention's operation in the second preferred embodiment. FIG. 2 shows the same four exchanges as in FIG. 1, except that member M, in exchange (3), digitally signs Authentication-M to form a digital signature $S_m$ ({Authentication-M}Sig_member_$_M$) and sends signature $S_m$, instead of Authentication-M, to key holder H. Further, key holder H in exchange (4) does not need to encrypt code $R_h$ to form encrypted code $R_{he}$, and key holder H in exchange (4) sends code $R_h$, instead of encrypted code $R_{he}$, to member M. Member M's digital signature $S_m$ provides strong and non-refutable proof that member M is the intended member M, and therefore this second preferred embodiment does not require, as the first embodiment does, that key holder H send encrypted code $R_{he}$ to member M. Consequently, key holder H, upon receiving signature $S_m$, verifies signature $S_m$ to confirm that key holder H received the communicated information from member M. If signature $S_m$ is invalid then key holder H presumably will cease communication with the unintended member M.

Figure 3:
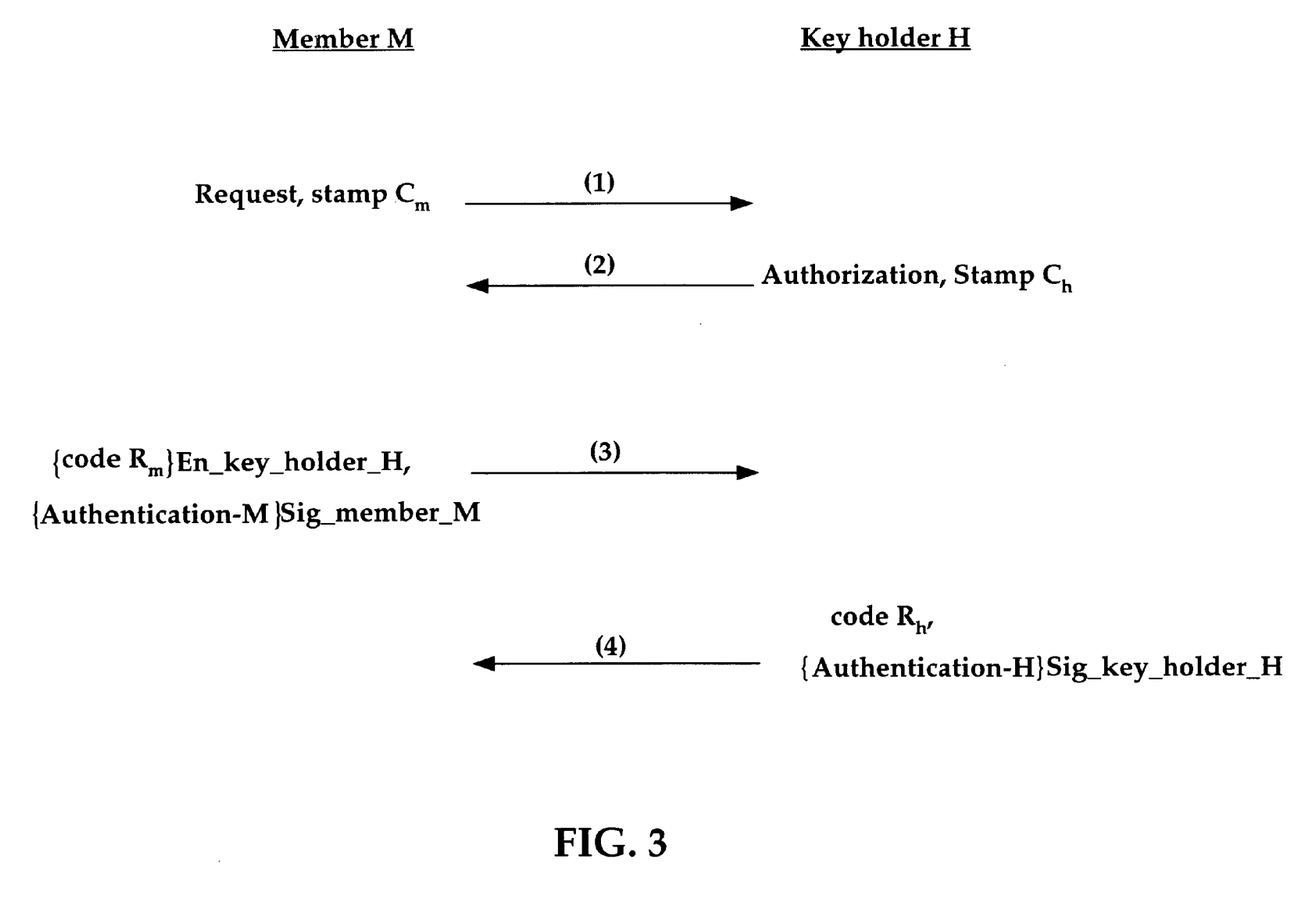
FIG. 3 illustrates a third preferred embodiment of the invention.

FIG. 3 illustrates the invention in the third preferred embodiment that shows four exchanges as in FIG. 2, except that key holder H, in exchange (4), digitally signs Authentication-H to form a digital signature $S_h$ ({Authentication-H}Sig_key_holder_H) and sends signature $S_h$, instead of Authentication-H, to member M. This signature $S_h$ provides additional verifiable proof of identity for key holder H. Member M verifies signature $S_h$ upon receiving it.

Figure 4:
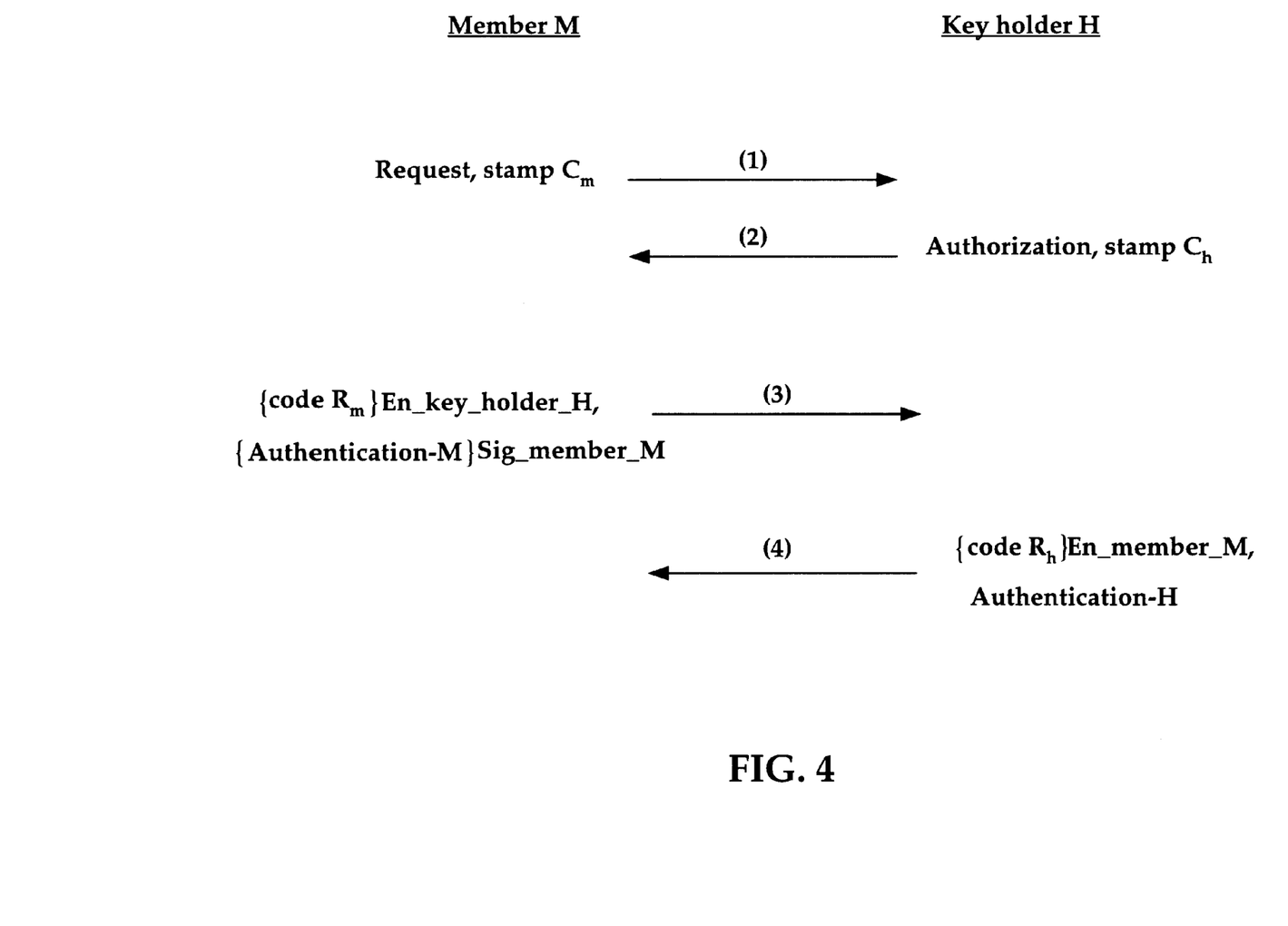
FIG. 4 illustrates a fourth preferred embodiment of the invention.

FIG. 4 illustrates the invention in the fourth preferred embodiment that shows the same four exchanges as in FIG. 1, except that member M in exchange (3) digitally signs Authentication-M to form a digital signature $S_m$ ({Authentication-M}Sig_member_M) and sends signature $S_m$, instead of Authentication-M, to key holder H. This fourth preferred embodiment, as compared to the first embodiment, provides additional authentication for member M in exchange (3).

Figure 5:
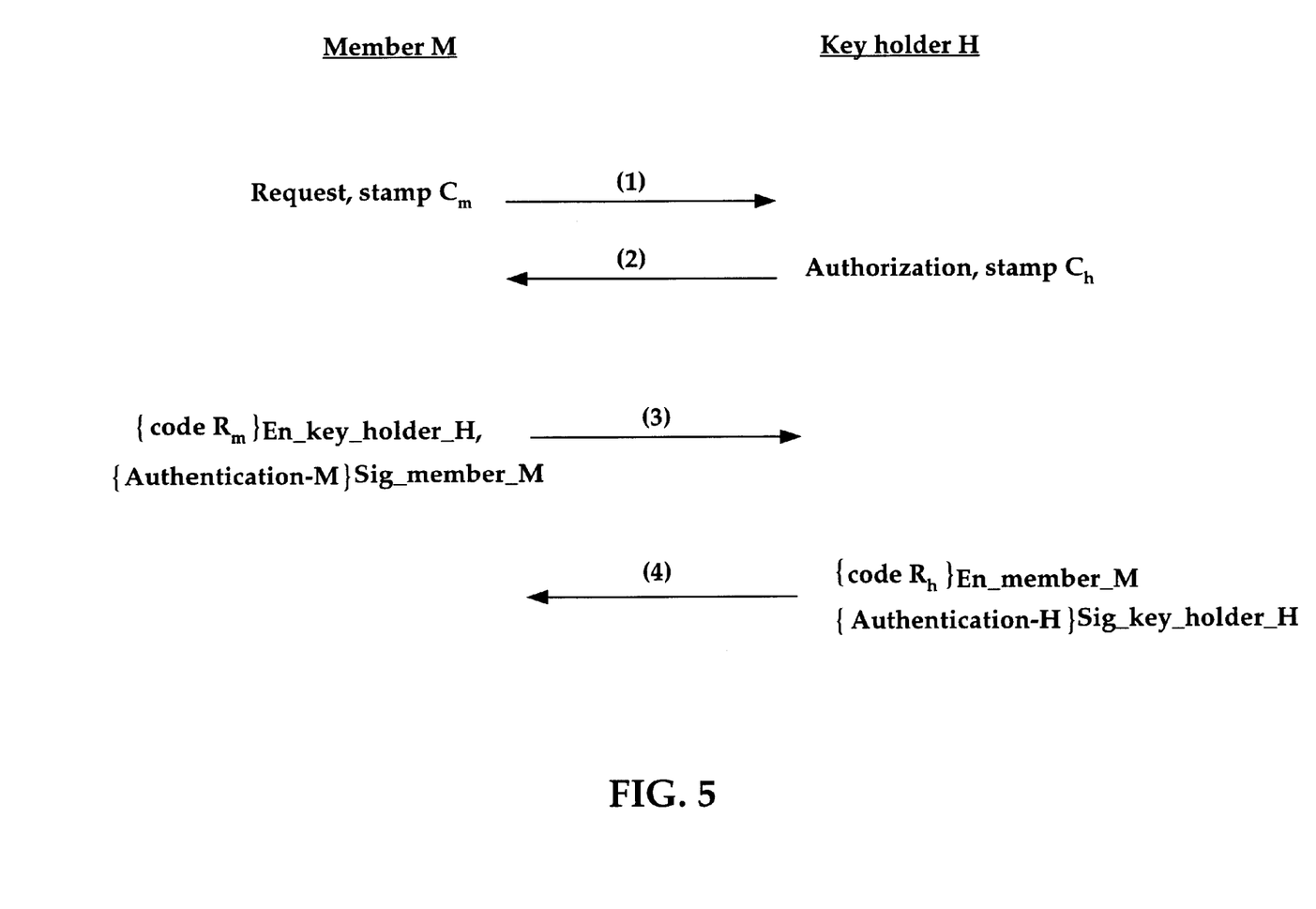
FIG. 5 illustrates a fifth preferred embodiment of the invention.

FIG. 5 illustrates the invention in the fifth preferred embodiment that shows the same four exchanges as in FIG. 4, except that key holder H in exchange (4) digitally signs Authentication-H to form a digital signature $S_h$ ({Authentication-H}Sig_key_holder_H) and sends signature $S_h$, instead of Authentication-H, to member M. This fifth preferred embodiment, as compared to the fourth embodiment, provides additional authentication for key holder H in exchange (4).

EXAMPLE APPLICATIONS OF THE INVENTION

A bank may have, for example, a network NA including $N_1$ number of routers A connecting a plurality of automated teller machines, which needs to communicate with a network NB including $N_2$ number of routers B connecting other banks and banking databases. Each router A securely communicating with each router B results in $N_1 \times N_2$ secret keys. However, if every router A in network NA belongs to the same group GA requiring one secret key to communicate with every router B in network NB, the number of secret keys is reduced to $N_2$. By the same analogy, if $N_2$ number of routers B in network NB belong to the same group GB using one key to communicate with network NA, the number of required secret keys is reduced to one, for both communication from group GA to group GB and from group GB to group GA. The key distribution method in accordance with the present invention reduces memory and performance requirements to store and manage a plurality of secret keys.

Virtual Private Network (VPN) applications can use the invention. A large scale network may include multiple entry points for other networks. The networks may communicate through the publicly accessible Internet, but network members may want to share information with only those in the same group, forming VPNs. The invention securely provides a common secret key for use by all members in the same private network group.

The invention in conjunction with a VPN can replace "800" telephone numbers for tele-commuters. Establishing 800 numbers for a company's employees to dial in and work from remote sites, employees'homes for example, is very common. These 800 telephone numbers and associated modems, with management and maintenance, are costly. A company thus can set up private networks as VPNs allowing members to work or share information with those in the same network group and distribute a group key to group members in accordance with the invention to replace communication channels connected through 800 telephone numbers.

Distributing a secret key, in accordance with the invention, to members in a "chat room" permits members in the "room" to securely communicate with one another.

The invention has been explained above with reference to five preferred embodiments. Other embodiments will be apparent to those skilled in the art after reading this disclosure. Therefore, these and other variations upon the preferred embodiments are intended to be covered by the appended claims.

What is claimed is:

1. A method for distributing a secret key K from a key holder to a group member, comprising the steps of:

the group member encrypting a code $R_m$ to form an encrypted code $R_{me}$;

the group member providing said encrypted code $R_{me}$ and an authentication-M to said key holder;

the key holder decrypting said encrypted code $R_{me}$ to acquire said code $R_m$;

the key holder verifying said authentication-M;

the key holder using said secret key K and said code $R_m$ as inputs to a reversible function to generate a code $R_h$;

the key holder encrypting said code $R_h$ to form an encrypted code $R_{he}$;

the key holder providing said code $R_{he}$ and an authentication-H to the group member;

the group member decrypting said encrypted code $R_{he}$ to acquire said code $R_h$;

the group member verifying said authentication-H; and the group member deriving said secret key K having said code $R_h$ and said code $R_m$ as inputs to the reversible function.

2. The method of claim 1 comprising the further steps of:

the group member providing a Request to the key holder; and the key holder providing an Authorization to the group member.

3. The method of claim 1 wherein said step of the group member providing said authentication-M comprises the steps of:

the group member signing said authentication-M to form a signature $S_m$; and the key holder verifying said signature $S_m$.

4. The method of claim 3 wherein said step of the key holder providing said authentication-H comprises the steps of:

the key holder signing said authentication-H to form a signature $S_h$; and the group member verifying said signature $S_h$.

5. The method of claim 1 wherein said step of the group member encrypting said code $R_m$ uses a public key $K_{ph}$ associated with said key holder, and said step of the key holder decrypting said encrypted code $R_{me}$ uses a private key associated with said public key $K_{ph}$.

6. The method of claim 5 wherein said step of the key holder encrypting said code $R_h$ uses a public key $K_{pm}$ associated with the group member, and said step of the group member decrypting said encrypted code $R_{he}$ uses a private key associated with said public key $K_{pm}$.

7. The method of claim 6 wherein said authentication-M results from a mixing function of at least one authentication-M input.

8. The method of claim 7 comprising the further steps of:

the key holder providing a stamp $C_h$ to the group member;

said authentication-M including said stamp $C_h$ as an input; and the key holder H verifying said stamp $C_h$.

9. The method of claim 8 wherein said stamp $C_h$ results from a mixing function of an identity of the group member, a timestamp, and a secret known only to the key holder.

10. The method of claim 9 wherein said authentication-H results from a mixing function of at least one authentication-H input.

11. The method of claim 10 comprising the further steps of:
the group member providing a stamp $C_m$ to the key holder;
said authentication-H including said stamp $C_m$ and said code $R_m$ as inputs; and
the group member verifying said stamp $C_m$.

12. The method of claim 11 wherein said stamp $C_m$ comprises an identity of the key holder H, a timestamp, and a secret known only to the group member.

13. The method of claim 12 wherein said code $R_m$ and said key K are numbers.

14. The method of claim 13 wherein said step of the key holder using said secret key K and said step of the group member deriving said secret key K use an exclusive-OR function.

15. The method of claim 14 wherein said step of the group member providing said authentication-M comprises the steps of:
the group member signing said authentication-M to form a signature $S_m$; and
the key holder verifying said signature $S_m$.

16. The method of claim 15 wherein said step of the key holder providing said authentication-H comprises the steps of:
the key holder signing said authentication-H to form a signature $S_h$; and
the group member verifying said signature $S_h$.

17. The method of claim 16 comprising the further steps of:
group member providing a Request to the key holder; and
the key holder providing an Authorization to the group member.

18. The method of claim 14 wherein said authentication-M further includes as inputs said code $R_m$, said stamp $C_m$ and said identity of the group member.

19. The method of claim 18 wherein said authentication-H further includes as inputs said stamp $C_h$, said code $R_h$, said identity of the group member, and said identity of the key holder.

20. The method of claim 19 wherein said step of the group member providing said authentication-M to the key holder comprises the steps of:
group member signing said authentication-M to form a signature $S_m$; and
the key holder verifying said signature $S_m$.

21. The method of claim 20 wherein said step of the key holder providing said authentication-H to the group member comprises the steps of:
the key holder signing said authentication-H to form a signature $S_h$; and
the group member verifying said signature $S_h$.

22. The method of claim 21 comprising the further steps of:
the group member providing a Request to the key holder; and
the key holder providing an Authorization to the group member.

23. A method for distributing a secret key K from a key holder to a group member, comprising the steps of:
the group member encrypting a code $R_m$ to form an encrypted code $R_{me}$;
the group member signing an authentication-M to form a signature $S_m$;
the group member providing said encrypted code $R_{me}$ and said signature $S_m$ to the key holder;
the key holder decrypting said encrypted code $R_{me}$ to acquire said code $R_m$;
the key holder verifying said signature $S_m$ and said authentication-M;
the key holder using said secret key K and said code $R_m$ as inputs to a reversible function to generate a code $R_h$;
the key holder providing said code $R_h$ and an authentication-H to the group member;
the group member verifying said authentication-H; and
the group member deriving said secret key K having said code $R_h$ and said code $R_m$ as inputs to the reversible function.

24. The method of claim 23 wherein said step of the group member encrypting said code $R_m$ uses a public key $K_{ph}$ associated with said key holder, and said step of the key holder decrypting said encrypted code $R_{me}$ uses a private key associated with said public key $K_{ph}$.

25. The method of claim 24 wherein said authentication-M results from a mixing function of at least one authentication-M input.

26. The method of claim 25 comprising the further steps of:
the key holder providing a stamp $C_h$ to said group member;
said authentication-M including said stamp $C_h$ and said code $R_m$ as inputs; and
the key holder H verifying said stamp $C_h$.

27. The method of claim 26 wherein said stamp $C_h$ results from a mixing function of an identity of the group member, a timestamp, and a secret known only to the key holder.

28. The method of claim 27 wherein said authentication-H results from a mixing function of at least one authentication-H input.

29. The method of claim 28 comprising the further steps of:
the group member providing a stamp $C_m$ to the key holder;
said authentication-H including said stamp $C_m$ and said code $R_m$ as inputs; and
the group member verifying said stamp $C_m$.

30. The method of claim 29 wherein said stamp $C_m$ results from a mixing function of an identity of the key holder, a timestamp, and a secret known only to the group member.

31. The method of claim 30 wherein said code $R_m$ and said key K are numbers.

32. The method of claim 31 wherein said step of the key holder using said secret key K and said step of the group member deriving said secret key K use an exclusive-OR function.

33. The method of claim 32 comprising the further steps of:
the group member providing a Request to the key holder; and
the key holder providing an Authorization to the group member.

34. The method of claim 33 wherein said authentication-M further includes as inputs said stamp $C_m$ and said identity of the group member.

35. The method of claim 34 wherein said authentication-H further includes as inputs said stamp $C_h$, said code $R_h$, said identity of group member M, and said identity of the key holder H.

36. A computer-readable medium embodying instructions for causing a device to perform a distribution of a secret key K from a key holder to a group member, said distribution comprising the steps of:

the group member encrypting a code $R_m$ to form an encrypted code $R_{me}$;

the group member providing said encrypted code $R_{me}$ and an authentication-M to said key holder;

the key holder decrypting said encrypted code $R_{me}$ to acquire said code $R_m$;

the key holder verifying said authentication-M;

the key holder using said secret key K and said code $R_m$ as inputs to a reversible function to generate a code $R_h$;

the key holder encrypting said code $R_h$ to form an encrypted code $R_{he}$;

the key holder providing said code $R_{he}$ and an authentication-H to the group member;

the group member decrypting said encrypted code $R_{he}$ to acquire said code $R_h$;

the group member verifying said authentication-H; and the group member deriving said secret key K having said code $R_h$ and said code $R_m$ as inputs to the reversible function.

37. The computer-readable medium of claim 36 wherein the step of the group member providing said authentication-M comprises the steps of:

the group member signing the said authentication-M to form a signature $S_m$; and the key holder verifying said signature $S_m$.

38. The computer-readable medium of claim 37 wherein the step of the key holder providing said authentication-H comprises the steps of:

the key holder signing said authentication-H to form a signature $S_h$; and the group member verifying said signature $S_h$.

39. A computer system for distributing a secret key K from a key holder to a group member, comprising:

means for the group member to encrypt a code $R_m$ to form an encrypted code $R_{me}$;

means for the group member to provide said encrypted code $R_{me}$, and an authentication-M to said key holder;

means for the key holder to decrypt said encrypted code $R_{me}$ to acquire said code $R_m$;

means for the key holder to verify said authentication-M;

means for the key holder to use said secret key K and said code $R_m$ as inputs to a reversible function to generate a code $R_h$;

means for the key holder to encrypt said code $R_h$ to form an encrypted code $R_{he}$;

means for the key holder to provide said code $R_{he}$, and an authentication-H to the group member;

means for the group member to decrypt said encrypted code $R_{he}$ to acquire said code $R_h$;

means for the group member to verify said authentication-H; and means for the group member to derive said secret key K having said code $R_h$ and said code $R_m$ as inputs to the reversible function.

40. The computer system of claim 39 wherein means for the group member to provide said authentication-M comprises:

means for the group member to sign said authentication-M to form a signature $S_m$; and means for the key holder to verify said signature $S_m$.

41. The computer system of claim 40 wherein means for the key holder to provide said authentication-H comprises:

means for they key holder to sign said authentication-H to form a signature $S_h$; and means for the group member to verify said signature $S_h$.

42. A computer-readable medium embodying instructions for causing a device to perform a distribution of a secret key K from a key holder to a group member, said distribution comprising the steps of:

the group member encrypting a code $R_m$ to form an encrypted code $R_{me}$;

the group member signing an authentication-M to form a signature $S_m$;

the group member providing said encrypted code $R_{me}$ and said signature $S_m$ to the key holder;

the key holder decrypting said encrypted code $R_{me}$ to acquire said code $R_m$;

the key holder verifying said signature $S_m$ and said authentication-M;

the key holder using said secret key K and said code $R_m$ as inputs to a reversible function to generate a code $R_h$;

the key holder providing said code $R_h$ and an authentication-H to the group member;

the group member verifying said authentication-H; and the group member deriving said secret key K having said code $R_h$ and said code $R_m$ as inputs to the reversible function.

43. The computer-readable medium of claim 42 wherein the step of the key holder providing said authentication-H comprises the steps of:

the key holder signing said authentication-H to form a signature $S_h$; and the group member verifying said signature $S_h$.

44. A computer system for distributing a secret key K from a key holder to a group member, comprising:

means for the group member to encrypt a code $R_m$ to form an encrypted code $R_{me}$;

means for the group member to sign an authentication-M to form a signature $S_m$;

means for the group member to provide said encrypted code $R_{me}$ and said signature $S_m$ to the key holder;

means for the key holder to decrypt said encrypted code $R_{me}$ to acquire said code $R_m$;

means for the key holder to verify said signature $S_m$ and said authentication-M;

means for the key holder to use said secret key K and said code $R_m$ as inputs to a reversible function to generate a code $R_h$;

means for the key holder to provide said code $R_h$ and an authentication-H to the group member;

means for the group member to verify said authentication-H; and means for the group member to derive said secret key K having said number $R_h$ and said $R_m$ as inputs to the reversible function.

45. The computer system of claim 44 wherein means for the key holder to provide said authentication-H comprises:

means for the key holder to sign said authentication-H to form a signature $S_h$; and means for the group member to verify said signature $S_h$.

* * * * *